(12) United States Patent
Awada et al.

(10) Patent No.: US 10,784,945 B2
(45) Date of Patent: Sep. 22, 2020

(54) ROBUST SYSTEM INFORMATION DELIVERY ON SUBSET OF BEAMS

(71) Applicant: NOKIA TECHNOLOGIES OY, Espoo (FI)

(72) Inventors: Ahmad Awada, Munich (DE); Manivannan Thyagarajan, Coppell, TX (US); Jorma Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/277,242

(22) Filed: Feb. 15, 2019

(65) Prior Publication Data
US 2019/0253124 A1    Aug. 15, 2019

Related U.S. Application Data

(60) Provisional application No. 62/631,068, filed on Feb. 15, 2018.

(51) Int. Cl.
| | |
|---|---|
| *H04B 7/06* | (2006.01) |
| *H04L 1/16* | (2006.01) |
| *H04W 48/14* | (2009.01) |
| *H04W 72/04* | (2009.01) |
| *H04L 27/26* | (2006.01) |

(Continued)

(52) U.S. Cl.
CPC ......... *H04B 7/0695* (2013.01); *H04L 1/1621* (2013.01); *H04L 27/2666* (2013.01); *H04W 48/14* (2013.01); *H04W 56/003* (2013.01); *H04W 72/046* (2013.01); *H04W 48/12* (2013.01)

(58) Field of Classification Search
CPC . H04B 7/0695; H04L 1/1621; H04L 27/2666; H04W 48/14; H04W 56/003; H04W 72/046; H04W 48/12
See application file for complete search history.

(56) References Cited

U.S. PATENT DOCUMENTS 9,974,073 B2 *    5/2018    Behravan .............. H04W 48/08
10,462,706 B2 *   10/2019   Turtinen ............... H04W 28/18
(Continued)

OTHER PUBLICATIONS

3GPP TS 38.300 V15.0.0 (Dec. 2017), Technical Specification, 3rd Generation Partnership Project; Technical Specification Group Radio Access Network; NR; NR and NG-RAN Overall Description; Stage 2 (Release 15), Dec. 2017.
(Continued)

*Primary Examiner* — Freshteh N Aghdam
(74) *Attorney, Agent, or Firm* — Squire Patton Boggs (US) LLP

(57) ABSTRACT

Systems, methods, apparatuses, and computer program products for robust system information (SI) delivery are provided. One method may include receiving, by a network node, a SI request from a UE, and transmitting an acknowledgement of the SI request to the UE. In one example, the method may include selecting, by the network node, a subset of downlink beams for transmitting the requested SI message. In an embodiment, the selecting may include selecting the subset of downlink beams based on SI requests associated with SS/PBCH blocks, and the subset of downlink beams associated with the SI requests are used for the delivery of an SI message.

20 Claims, 6 Drawing Sheets

(51) Int. Cl.
*H04W 56/00* (2009.01)
*H04W 48/12* (2009.01)

(56) References Cited

U.S. PATENT DOCUMENTS

2018/0279377 A1* 9/2018 Lin .................. H04W 72/0406
2019/0364485 A1* 11/2019 Geng ................. H04W 72/005

OTHER PUBLICATIONS

3GPP TS 38.213 V15.0.0 (Dec. 2017), Technical Specification, 3rd Generation Partnership Project; Technical Specification Group Radio Access Network; NR; Physical layer procedures for control (Release 15), Dec. 2017.

3GPP TS 38.331 V15.0.0 (Dec. 2017), Technical Specification, 3rd Generation Partnership Project; Technical Specification Group Radio Access Network; NR Radio Resource Control (RRC) protocol specification (Release 15), Dec. 2017.

3GPP TS 38.211 V15.0.0 (Dec. 2017), Technical Specification, 3rd Generation Partnership Project; Technical Specification Group Radio Access Network; NR; Physical channels and modulation (Release 15), Dec. 2017.

3GPP TS 38.214 V15.0.0 (Dec. 2017), Technical Specification, 3rd Generation Partnership Project; Technical Specification Group Radio Access Network; NR; Physical layer procedures for data (Release 15), Dec. 2017.

Ericsson, "Remaining details on other system information delivery," 3GPP Draft; R1-1800895, 3GPP TSG RAN WG1 Meeting AH 1801, Vancouver, Canada, Jan. 22-26, 2018.

Huawei, "[Draft] Agreements on Paging," R1-1801248, 3GPP TSG RAN WG1 Meeting AH 1801, Vancouver, Canada, Jan. 22-26, 2018.

RAN WG1, "Agreements on Paging," R1-1801280, 3GPP TSG RAN WG1 Meeting AH 1801, Vancouver, Canada, Jan. 22-26, 2018.

* cited by examiner

ROBUST SYSTEM INFORMATION DELIVERY ON SUBSET OF BEAMS

CROSS-REFERENCE TO RELATED APPLICATIONS

This application claims priority from U.S. provisional patent application No. 62/631,068 filed on Feb. 15, 2018. The contents of this earlier filed application are hereby incorporated by reference in their entirety.

FIELD

Some example embodiments may generally relate to mobile or wireless telecommunication systems. For instance, various example embodiments may be directed to system information (SI) delivery in telecommunication systems, such as Long Term Evolution (LTE), fifth generation (5G) or new radio (NR) systems, or other wireless systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method that may include receiving, by a network node, a SI request from a UE, and transmitting an acknowledgement of the SI request to the UE. In one example, the method may include selecting, by the network node, a subset of downlink beams for transmitting the requested SI message. In an embodiment, the selecting may include selecting the subset of downlink beams based on SI requests associated with SS/PBCH blocks, and the subset of downlink beams associated with the SI requests are used for the delivery of an SI message.

According to certain embodiments, the method may further include, for example when the UE has determined that the downlink beam associated with the SI request is no longer valid for receiving the SI message, receiving, from the UE, a new SI request. In one example, the new SI request may be associated with an updated SS/PBCH block index. According to some embodiments, the re-transmitted (new) SI request may include an indication informing the network node that the new SI request is actually a re-transmission of a previously sent SI request associated with a downlink beam that is no longer valid for reception.

The method may also include, based on the updated SS/PBCH block index, transmitting the SI message on a new downlink beam, such as on the selected subset of downlink beams that is valid for reception at the UE. In an example embodiment, the method may also include receiving, from the UE, the number/index of the SS/PBCH block that the UE can no longer use for receiving the SI message.

Another embodiment is directed to an apparatus that may include at least one processor and at least one memory comprising computer program code. The at least one memory and computer program code may be configured, with the at least one processor, to cause the apparatus at least to receive a SI request from a UE, and transmit an acknowledgement of the SI request to the UE. In one example, the apparatus may be caused to select a subset of downlink beams for transmitting the requested SI message. In an embodiment, the selection of the subset of downlink beams may be based on SI requests associated with SS/PBCH blocks, and the subset of downlink beams associated with the SI requests are used for the delivery of an SI message.

In one embodiment, the at least one memory and computer program code may be further configured, with the at least one processor, to cause the apparatus at least to, for example when the UE has determined that the downlink beam associated with the SI request is no longer valid for receiving the SI message, receive a new SI request from the UE. In one example, the new SI request may be associated with an updated SS/PBCH block index. According to some embodiments, the re-transmitted (new) SI request may include an indication informing the apparatus that the new SI request is actually a re-transmission of a previously sent SI request associated with a downlink beam that is no longer valid for reception.

The at least one memory and computer program code may be further configured, with the at least one processor, to cause the apparatus at least to, based on the updated SS/PBCH block index, transmit the SI message on a new downlink beam, such as on the selected subset of downlink beams that is valid for reception at the UE. In an example embodiment, the at least one memory and computer program code may be further configured, with the at least one processor, to cause the apparatus at least to receive, from the UE, the number/index of the SS/PBCH block that the UE can no longer use for receiving the SI message.

Another embodiment is directed to a method that may include receiving, from a UE, a SI request, and transmitting an ACK message including an indication to the UE that the SI message will be delivered in a time window that is shorter than a SI period.

According to one embodiment, the method may further include transmitting the requested SI message on a subset of downlink beams that is valid for reception at the UE. In an embodiment, the transmitting may further include informing the UE that the requested SI message will be transmitted on a same subset of downlink beams associated with the SI request, for example, within a time duration that is much shorter than the SI period.

According to one example, the transmitting may also include indicating, to the UE, the time duration that the UE should monitor to receive the SI message. In one embodiment, transmitting may also include transmitting the indication when the time duration between receiving the SI request and start of the SI window is large enough that the subset of downlink beams corresponding to the SI request may no longer be assumed to be valid for reception in SI window. In yet another embodiment, the method may further include configuring the UE to send SI requests for an SI message only within a time duration before the SI window of the corresponding message starts.

Another embodiment is directed to an apparatus that may include at least one processor and at least one memory comprising computer program code. The at least one memory and computer program code may be configured, with the at least one processor, to cause the apparatus at least to receive, from a UE, a SI request, and to transmit an ACK message including an indication to the UE that the SI message will be delivered in a time window that is shorter than a SI period.

According to one embodiment, the at least one memory and computer program code may be configured, with the at least one processor, to cause the apparatus at least to transmit the requested SI message on a subset of downlink beams that is valid for reception at the UE. In an embodiment, the apparatus may also be controlled to inform the UE that the requested SI message will be transmitted on a same subset of downlink beams associated with the SI request, for example, within a time duration that is much shorter than the SI period.

According to one example, the apparatus may also be controlled to further indicate, to the UE, the time duration that the UE should monitor to receive the SI message. In one embodiment, the apparatus may also be controlled to transmit the indication when the time duration between receiving the SI request and the start of SI window is large enough that the subset of downlink beams corresponding to the SI request may no longer be assumed to be valid for reception. In yet another embodiment, the apparatus may be further controlled to configure the UE to send SI requests for an SI message only within a time duration before the SI window of the corresponding message starts.

Another embodiment is directed to a method that may include monitoring SS/PBCH blocks to determine whether a subset of downlink beams associated with a transmitted SI request is still valid for receiving the requested SI message. According to an embodiment, when it is determined that the subset of downlink beams associated with the previously transmitted SI request is no longer valid for receiving the requested SI message, the method may include checking RMSI to determine whether the requested SI message will be broadcast using all downlink beams, or transmitting a new SI request.

According to an embodiment, if it is determined that the requested SI message will not be broadcast, the method may include transmitting a new SI request to the network. In one example, the new SI request may be associated with an updated SS/PBCH block index. In one embodiment, if it is determined that the requested SI message will be broadcast, then the method may include waiting for the broadcast of the SI message without transmitting the new SI request. According to another embodiment, when it is determined that the subset of downlink beams associated with the previously transmitted SI request is no longer valid for receiving the requested SI message, the method may include directly transmitting the new SI request without checking the RMSI.

In an example embodiment, it may be determined whether the subset of downlink beams associated with a transmitted SI request is still valid for receiving the requested SI message, for example, based on whether a received signal of the subset of downlink beams associated with the SI request is below a certain threshold, on an order of superiority between the detected SS/PBCH blocks, or on some relative received power difference between them, or on an absolute threshold. According to one example embodiment, the method may also include transmitting, to the network node, the number/index of the SS/PBCH block that the UE can no longer use for receiving the SI message.

Another embodiment is directed to an apparatus that may include at least one processor and at least one memory comprising computer program code. The at least one memory and computer program code may be configured, with the at least one processor, to cause the apparatus at least to monitor SS/PBCH blocks to determine whether a subset of downlink beams associated with a previously transmitted SI request is still valid for receiving the requested SI message. According to an embodiment, when it is determined that the subset of downlink beams associated with the previously transmitted SI request is no longer valid for receiving the requested SI message, the at least one memory and computer program code may be further configured, with the at least one processor, to cause the apparatus at least to check RMSI to determine whether the requested SI message will be broadcast using all downlink beams, or to transmit a new SI request.

According to an embodiment, if it is determined that the requested SI message will not be broadcast, the at least one memory and computer program code may be further configured, with the at least one processor, to cause the apparatus at least to transmit a new SI request to the network. In one example, the new SI request may be associated with an updated SS/PBCH block index. In one embodiment, if it is determined that the requested SI message will be broadcast, then the at least one memory and computer program code may be further configured, with the at least one processor, to cause the apparatus at least to wait for the broadcast of the SI message without transmitting the new SI request. According to another embodiment, when it is determined that the subset of downlink beams associated with the previously transmitted SI request is no longer valid for receiving the requested SI message, the at least one memory and computer program code may be further configured, with the at least one processor, to cause the apparatus at least to directly transmit the new SI request without checking the RMSI.

In an example embodiment, the apparatus may determine whether the subset of downlink beams associated with a transmitted SI request is still valid for receiving the requested SI message, for example, based on whether a received signal of the subset of downlink beams associated with the SI request is below a certain threshold, on an order of superiority between the detected SS/PBCH blocks, or on some relative received power difference between them, or on an absolute threshold. According to one example embodiment, the apparatus may also be controlled to transmit, to the network node, the number/index of the SS/PBCH block that the UE can no longer use for receiving the SI message.

Another embodiment is directed to a method that may include transmitting a SI request to a network node, and receiving an ACK message including an indication that the requested SI message will be delivered in a time window that is shorter than the SI period. In one example, the indication may further include an indication of the time duration that the UE should monitor to receive the requested SI message. In an embodiment, the receiving may include receiving the indication when the time duration between receiving the SI request and the start of SI window is large enough that a subset of downlink beams corresponding to the SI request may no longer be assumed to be valid for reception in SI window. The method may then include monitoring the indicated time window for the SI message.

Another embodiment is directed to an apparatus that may include at least one processor and at least one memory comprising computer program code. The at least one memory and computer program code may be configured, with the at least one processor, to cause the apparatus at least to transmit a SI request to a network node, and receive an ACK message including an indication that the SI message will be delivered in a time window that is shorter than the SI period. In one example, the indication may further include an indication of the time duration that the UE should monitor to receive the SI message. In an embodiment, the indication may be received when the time duration between receiving the SI request and the start of SI window is large enough that the subset of downlink beams corresponding to the SI request may no longer be assumed to be valid for reception in SI window. The at least one memory and computer program code may be further configured, with the at least one processor, to cause the apparatus at least to monitor the indicated time window for the SI message.

BRIEF DESCRIPTION OF THE DRAWINGS

For proper understanding of the invention, reference should be made to the accompanying drawings, wherein.

DETAILED DESCRIPTION

Figure 1:
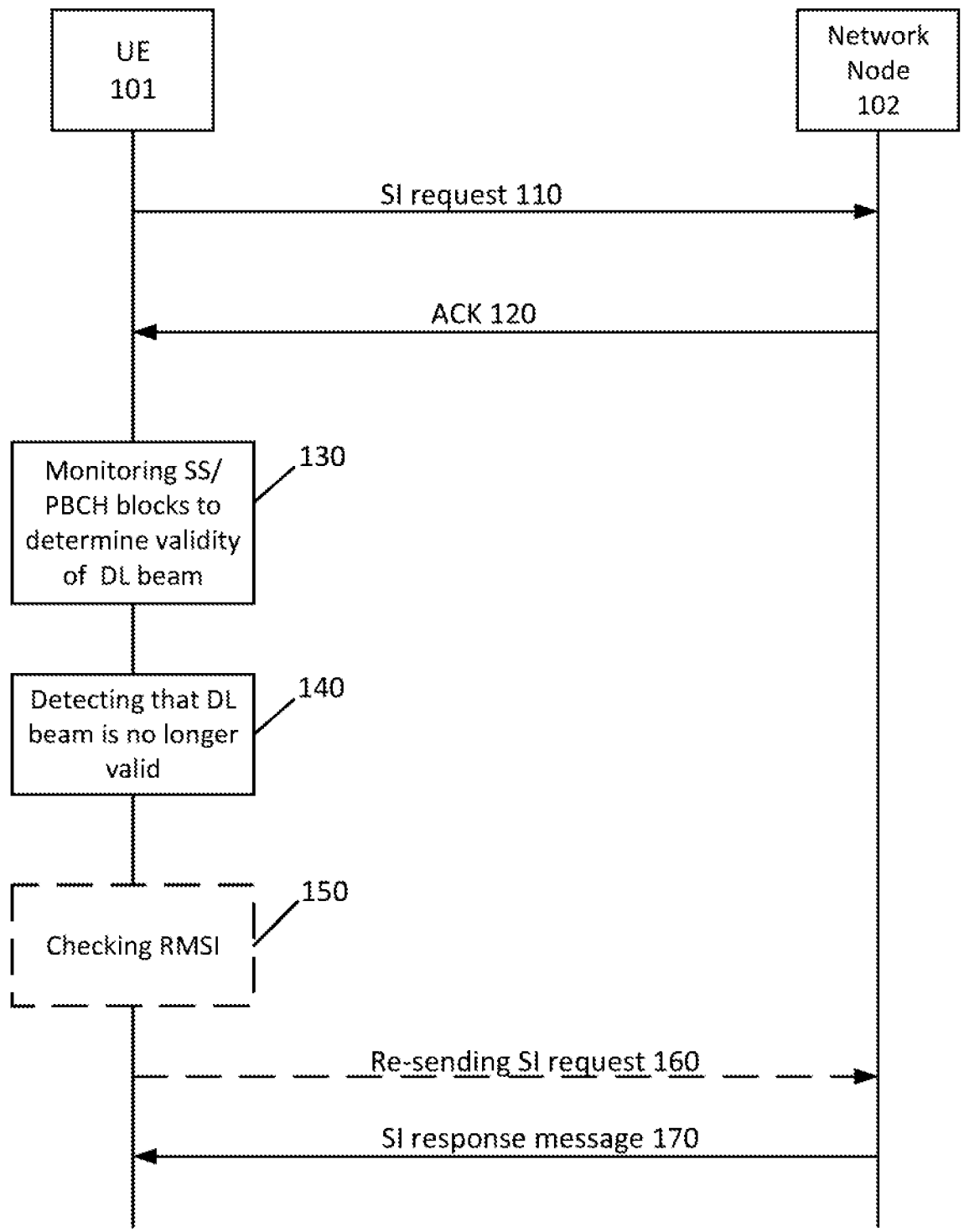
FIG. 1 illustrates an example signaling flow diagram, according to one embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for robust system information (SI) delivery, as represented in the attached figures and described below, is not intended to limit the scope of certain embodiments but is representative of selected example embodiments.

The features, structures, or characteristics of example embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

In NR, the System Information (SI) may be split into: (1) minimum SI, and (2) other SI. The minimum SI contains the essential information for public land mobile network (PLMN) selection, cell selection, layer 1 (L1)/layer 2 (L2) parameters for initial access (i.e., content of master information block (MIB), system information block 1 (SIB 1) and system information block 2 (SIB 2) in LTE). The other SI contains the remaining SI with information that is not part of the minimum SI. The minimum SI may be transmitted over two different downlink (DL) channels using different radio resource control (RRC) messages in NR (e.g., MasterInformationBlock and SystemInformationBlockType1). The term Remaining Minimum SI (RMSI) may also be used to refer to SystemInformationBlockType1. The other SI may be transmitted in SystemInformationBlockType2 and above.

The minimum SI and RMSI may be broadcasted periodically like in the LTE system, whereas the other SI may be periodically broadcasted or delivered on demand. The RMSI may include an indicator whether the concerning SI/SIB message is provided by broadcast or on demand, i.e., one or multiple SIBs may be mapped to an SI message. For NR systems operating at high carrier frequency or employing transmit (Tx) beamforming in general, the broadcast transmission may be performed using a grid of beams sweeping a set of beams in horizontal and vertical directions to cover all the area of a cell.

The parameters required for requesting an on-demand other SI message using Msg 1 or Msg 3 may be included in the RMSI. The network may acknowledge the SI request of the UE in Msg 2 or Msg 4, depending on whether SI request is performed using Msg 1 or Msg 3, respectively. Moreover, to inform the UE on how to receive the other SI, the RMSI may include the scheduling information, such as the mapping of the SIBs to SI messages, the configuration of the length of the SI window pertaining to each SI message, i.e., the time duration over which the SI message is delivered by the network and scheduled periodically, the periodicity of the SI window, and the number of repetitions within the SI window, etc. The UE can improve the detection probability by combining the multiple repetitions within the SI window, i.e., by providing combining/diversity gain.

In order to limit the number of SI requests, the UE may check in the RMSI whether the SI message of interest will be provided by broadcast before sending the SI request. If the required SI message is not broadcasted, the UE may first send an SI request, otherwise the UE may monitor directly the scheduling information of the SI message for reception.

For synchronization, the UE may monitor synchronization signal/physical broadcast channel (SS/PBCH) blocks candidate locations defined in certain $3^{rd}$ generation partnership project (3GPP) specifications. One SS/PBCH block may include four orthogonal frequency division multiplex (OFDM) symbols and may contain a primary synchronization signal (PSS), a secondary synchronization signal (SSS), physical broadcast channel (PBCH) containing MIB along with demodulation deference signal (DMRS). Each SS/PBCH block may be sent to a specific direction to ensure sufficient coverage for the broadcast and synchronisation. The maximum number L of SS/PBCH block candidate locations per frequency range may determine the maximum number of beams in beam sweep.

The UE may obtain the SS/PBCH block index from each SS/PBCH block. For instance, for L=4 and L>4, the UE may determine the two least significant bits (LSB) of the SS/PBCH block index per half-frame from one-to-one mapping with an index of the DMRS sequence transmitted in the PBCH. For L=64 (for frequencies above 6 GHz), the UE may determine the remaining 3 most significant bits (MSB) from the higher layer parameter SSB-index-explicit in MIB.

When monitoring for RMSI or other SI, i.e., trying to receive physical downlink control channel (PDCCH) or physical downlink shared channel (PDSCH) for RMSI or broadcasted other SI, a UE may assume that the DMRS port of PDCCH and/or PDSCH are quasi co-located (QCL) with the associated SS/PBCH block. For RMSI, the association may be determined by the monitoring occasions corresponding to each SS/PBCH block index. The details of other SI monitoring occasions have not yet been determined, but similar associations as for RMSI and SS/PBCH block will be supported.

Broadcasting a SI message is expensive in terms of downlink radio resources since the same content has to be repeated on all beams of a cell which can be up to L=64 in NR. In case the number of SI requests in the cell is small, i.e., only a few UEs in the cell have requested the SI message, it may be beneficial if the network sends the requested SI message only on the downlink beams (identified by SS/PBCH block index) associated with the received SI requests. For example, one approach may be for the network to learn or count the number of UEs interested in an on-demand SI message in different time periods and make profiles for the different times of the day, i.e., low number of SI request in early morning/night, much higher during rush hour, and so on. In this learning phase, the network can transmit the SI message in the direction of the requesting UE upon receiving an SI request. Alternatively, the network may assume at the beginning of each SI period that the broadcast on a subset of beams would be the baseline transmission approach. If the number of received SI request becomes larger than a threshold, the network may decide to broadcast the SI message on all beams to refrain further UEs from sending their SI requests. The configuration of the threshold may be subject to network dimensioning and optimization similar to any other configuration parameter.

The association between the received SI request and the downlink transmit beam (delivering the SI message) may be implicitly defined. After sending the SI request in uplink based on an association with SS/PBCH block index X, the UE should expect to receive the on-demand SI message from time occasions associated with SS/PBCH block X.

For enabling the transmission of on-demand SI message on a subset of all beams, a solution has been proposed in which the UE may check if a certain on-demand SI message is already being broadcasted before requesting it. According to this proposal, UE that has requested a certain on-demand SI message is not mandated to check any associated broadcast flag before trying to receive it, i.e., the UE does not need to check the RMSI for broadcast after the SI request has been sent and before the SI message is received. After having transmitted an SI request associated with a particular SS/PBCH block index (i.e., PRACH occasion), the UE may assume that the on-demand SI message will be delivered on time occasions associated with SS/PBCH block X (e.g., to broadcast beam X). Thus, if the network does not indicate in RMSI that the SI message will be delivered by broadcast, the UE can assume that the requested SI message will be delivered on the downlink beam associated with the SI request.

However, this solution has the problem that the downlink beam transmitting the SI message and associated with the SI request may no longer be suitable/strong enough for receiving the SI message. In other words, the best reception downlink beam of the UE may change while waiting for the SI window due to, for example, obstruction by moving obstacles, pedestrians, or UE movement or rotation, etc. As such, the UE may fail to receive the requested SI message in the SI window since the network will not deliver it in the new beam direction detected by the UE. Indeed, this problem is likely to occur because the time duration between the time the SI request/or SI acknowledgement (ACK) is sent/received and the occurrence of the SI window can be quite large depending on the configuration of SI periodicity. For instance, if LTE values of SI periodicity are taken as baseline, the time duration may be 80 ms, 160 ms, 320 ms, 640 ms, 1.28 s, 2.56 s and 5.12 s.

Therefore, presently, on-demand SI content is broadcast on all beams, which is particularly inefficient when the number of UEs wanting on-demand SI is low and when the number of beams is high (e.g., up to 64 in NR). The network can determine a sub-set of beams to use for sending on-demand SI content by determining which 'SS/PBCH blocks' the UEs use when they synchronise to the network. The network determines this information from the implicit association between the received SI request and SS/PBCH block index.

Since the best sub-set of beams to use for sending SI may change by the time the on-demand SI is broadcast, one embodiment provides that the UE may re-transmit the on-demand request when the UE synchronises to a different 'SS/PBCH block'. Another embodiment is directed to reducing the time between the network receiving an on-demand SI request and the network broadcasting the on-demand SI message. These example embodiments will be discussed in more detail below.

Some example embodiments provide methods for increasing the robustness of SI delivery on a subset of beams. For example, certain embodiments enable the network and UEs (which may be in RRC idle/inactive state) to synchronize on the time occasions and the subset of all downlink beam(s) for receiving a requested SI message.

In one embodiment, a UE may be configured to continue monitoring the SS/PBCH blocks, which are the resource blocks carrying primary/secondary synchronization signals and physical broadcast channel, after receiving the ACK for the SI request, for example, associated with SS/PBCH block index X. According to an example embodiment, if a lower/physical layer of the UE detects that SS/PBCH block index X is no longer valid for receiving the requested SI message, it may inform the upper/RRC layer of the UE which may trigger a procedure where the UE checks again in the RMSI whether the SI message will be delivered by broadcast. In one example, as a part of this procedure, the UE may select a new SS/PBCH block (e.g., with index m, where m≠X) based on which it obtains the RMSI. If the RMSI information indicates that the other SI (of interest) will be delivered by broadcast, the UE may start to monitor the SI window/occasion associated with the SS/PBCH block (e.g., of index m). Otherwise, if the RMSI information does not indicate that the other SI (of interest) will be delivered by broadcast, the RRC layer of the UE may re-transmit the SI request (which will be associated later on in the physical layer with the new SS/PBCH block (beam)). In an embodiment, having received an acknowledgement to the new SI request associated with the new SS/PBCH block index (i.e., beam), the UE may start to monitor the SI window/occasions associated with the new SS/PBCH block (e.g., of index m).

In another embodiment, the network may inform the UE that the requested SI message will be broadcasted on the same beam associated with the SI request within a time duration that is much shorter than the SI period. For example, the time duration may be short enough that the downlink beam X associated with the SI request remains suitable for SI reception. In other words, as one example, the indicated time duration is such that the downlink beam transmitting the SI message and associated with the SI request is still strong enough to receive the SI message.

In yet another embodiment, the network may configure the UEs to send the SI requests for an on-demand SI message only within a time duration before the SI window of the corresponding message starts. For example, the time duration may be short enough that the downlink beam X associated with the SI request remains suitable for SI reception. The time duration may be configured by the network or given in the specifications.

FIG. 1 illustrates an example signaling diagram, according to certain embodiments of the invention. As illustrated in the example of FIG. 1, at 110, a UE 101 may transmit a SI request to a network node 102, such as a base station, eNB or gNB. At 120, the network node 102 may transmit an ACK acknowledging the SI request to the UE 101.

After receiving the ACK message, the UE 101 may monitor, at 130, the SS/PBCH blocks to determine if the downlink beam associated with the SI request is no longer valid for receiving the requested SI message. For example, in an embodiment, the UE 101 may check if a received signal of the downlink beam associated with the SI request is below a certain threshold. In one example, the threshold may be pre-configured by the network. In some embodiments, the UE 101 may determine the validity of the downlink beam based, for example, on an order of superiority between the detected SS/PBCH blocks, on some relative received power difference between them, or on an absolute threshold.

According to certain examples, the UE may not need to monitor all the SS burst sets (where one SS burst corresponds to one complete SS/PBCH block sweep) located between the time instant the ACK is received and the SI window. It is noted that a SS burst set may refer to the half-frame in which the SS/PBCH blocks are sent.

In one example, when the UE 101 detects, at 140, that the downlink beam associated with the SI request is no longer valid for reception, the UE 101 may, at 150, re-check in RMSI (e.g., SIB1 in NR) whether the requested SI message will be delivered by broadcast before re-transmitting the SI request at 160. Thus, if the UE 101 determines from re-checking the RMSI that the requested SI message will be delivered by broadcast, then the UE 101 will skip step 160 and not re-transmit the SI request.

In another example, when the UE 101 detects, at 140, that the downlink beam associated with the SI request is no longer valid for reception, the UE 101 may re-send the SI request directly, at 160, without checking the RMSI. In other words, according to this example embodiment, the UE 101 skips the step 150 of re-checking the RMSI and proceeds directly to re-transmitting the SI request at 160. According to some embodiments, the UE 101 may inform the network that the new SI request 160 is actually a re-transmission of a previously sent SI request 110 associated with a downlink beam that is no longer valid for reception. In an embodiment, the UE 101 may also indicate, to the network, the number/index of the SS/PBCH block (beam) that the UE 101 can no longer use for receiving the SI message. As an example, the UE indication that the new SI request 160 is a re-transmission may be signaled in Msg 3 carrying the SI request, or in Msg 1 if extended with a data part, or in a separate message than the one carrying the SI request.

After receiving the new SI request 160, the network node 102 may transmit the SI message, at 170, on the new downlink beam and may refrain from sending it on the downlink beam that the UE can no longer use for SI reception (e.g., if the number of SS/PBCH block is conveyed to the network).

Figure 2:
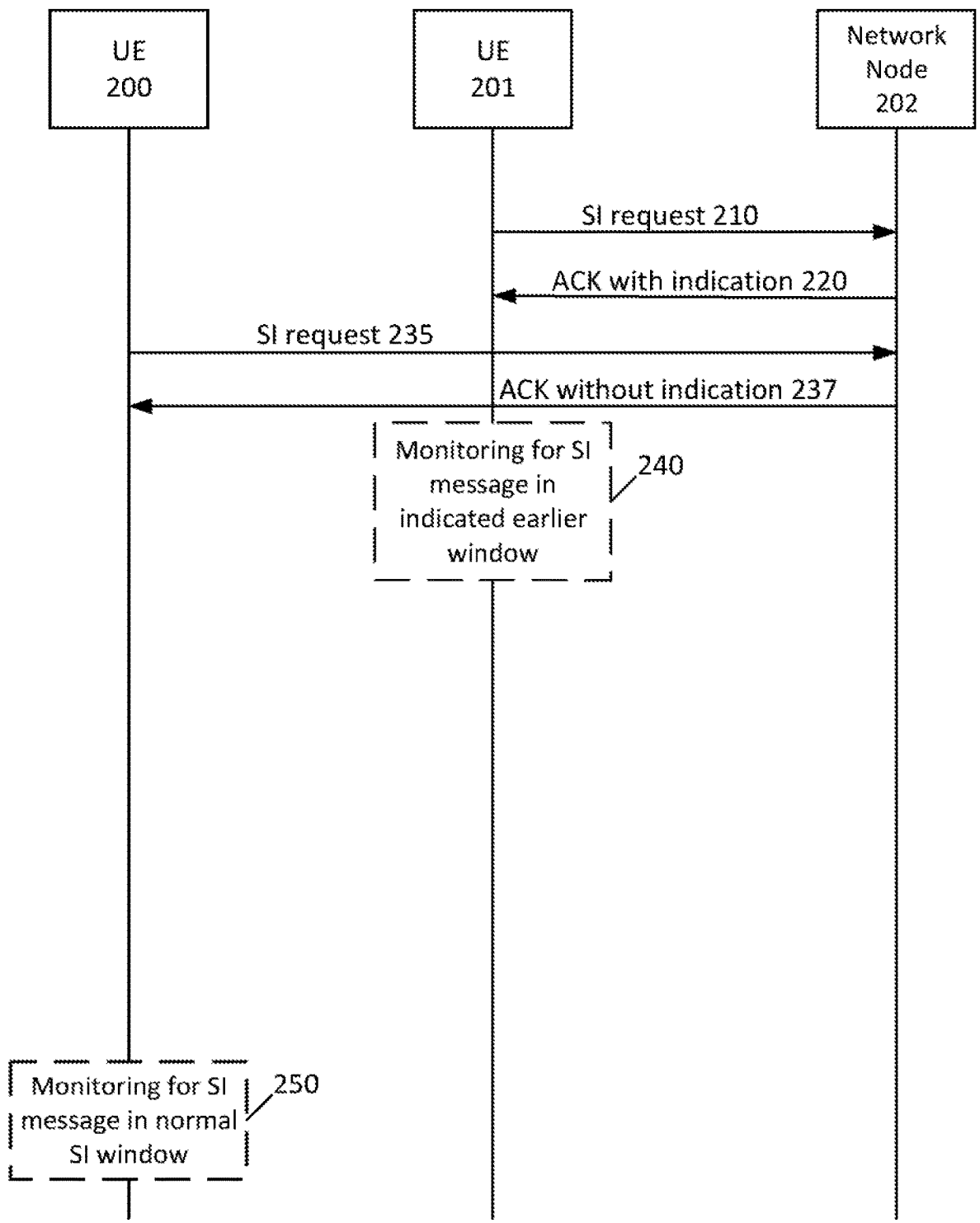
FIG. 2 illustrates an example signaling flow diagram, according to another embodiment.

FIG. 2 illustrates an example signaling diagram, according to some additional embodiments of the invention. As illustrated in the example of FIG. 2, at 210, a UE 201 may transmit a SI request to a network node 202, such as a base station, eNB or gNB. In this example embodiment, at 220, the network node 202 may transmit an ACK including an indication to the UE 201 that the SI message will be delivered shortly after receiving the ACK message, which will be much earlier than the SI window. In other words, in this example, the network node 202 may indicate that the SI message will be delivered in a time window or occasion that is shorter than the SI period. According to one example, the network indication may be transmitted as part of the ACK in Msg 2 when the SI request is performed using Msg 1. In another example, the network indication may be transmitted as part of the ACK in Msg 4 when the SI request is performed using Msg 3. According to certain embodiments, the network node 202 may also indicate to the UE 201 the time duration that the UE should monitor to receive the SI message.

In some embodiments, the scheduling information for the SI message delivered shortly after the ACK may be conveyed in ACK MSG 2 or Msg 4, in a DCI scheduling the SI message, in RMSI, or fixed in the specifications. The scheduling information for the SI message may include, for example, time/frequency resources, modulation coding scheme (MCS), time duration for monitoring the SI message, etc.

According to certain embodiments, the network node 202 may send the indication, at 220, if the time duration between receiving the SI request and the start of SI window is large enough that the downlink beam corresponding to the SI request may no longer be assumed to be valid for reception in SI window.

In an embodiment, UE(s) that receive the network indication in the ACK message may monitor the SI message in the time window that is scheduled shortly after receiving the ACK. In the example of FIG. 2, the UE 201, after receiving the indication at 220, monitors the SI message in the indicated time window, at 240, shortly after receiving the indication.

However, in an embodiment, UE(s) that do not receive any network indication in the ACK message monitor the SI window for receiving the requested SI message. Hence, in the example of FIG. 2, the UE 200, which sends its SI request at 235 and receives an ACK with no indication at 237, monitors the SI window at 250 to receive the requested SI message.

Figure 3A:
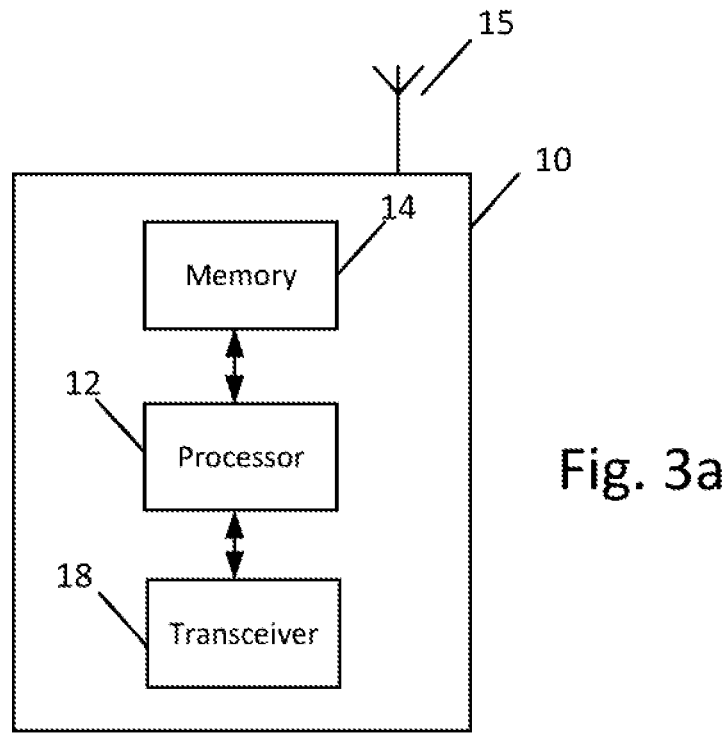
FIG. 3a illustrates an example block diagram of an apparatus, according to one embodiment.

FIG. 3a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 3a.

As illustrated in the example of FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the signaling flow diagrams illustrated in FIG. 1 or 2. For example, in certain embodiments, apparatus 10 may be controlled by memory 14 and processor 12 to perform one or more of the steps performed by the network node 102 of FIG. 1 or the network node 202 of FIG. 2. In some embodiments, for instance, apparatus 10 may be configured to perform a process for robust SI delivery on a subset of beams.

In one embodiment, apparatus 10 may be configured to receive a second SI request when a UE synchronizes to a different SS/PBCH block from the one associated with the original SI request. For instance, in this example embodiment, apparatus 10 may be controlled by memory 14 and processor 12 to receive, from the UE, a SI request and to transmit an ACK acknowledging the SI request to the UE. According to certain embodiments, apparatus 10 may be controlled by memory 14 and processor 12 to select a subset of downlink beams for transmitting a requested SI message. In one example, the subset of downlink beams may be selected based on the SI requests associated with the SS/PBCH blocks. In certain embodiments, only a subset of downlink beams associated with SI requests are used for the delivery of an SI message.

In an embodiment, when the UE determines that the downlink beam associated with the SI request is no longer valid for receiving the requested SI message, apparatus 10 may be controlled by memory 14 and processor 12 to receive a new SI request from the UE. The new SI request may be associated with an updated SS/PBCH block index. According to some embodiments, the re-transmitted (new) SI request may include an indication informing apparatus 10 that the new SI request is actually a re-transmission of a previously sent SI request associated with a downlink beam that is no longer valid for reception.

In an embodiment, apparatus 10 may receive the new SI request along with an indication of the number/index of the SS/PBCH block (beam) that the UE can no longer use for receiving the SI message. As an example, the UE indication that the new SI request is a re-transmission may be received by apparatus 10 in Msg 3 carrying the SI request, or in Msg 1 if extended with a data part, or in a separate message than the one carrying the SI request. After receiving the new SI request, apparatus 10 may be controlled by memory 14 and processor 12 to transmit the SI message on the new downlink beam that the UE has synchronized to, and apparatus 10 may refrain from sending the SI message on the downlink beam that the UE can no longer use for SI reception (e.g., if the number of SS/PBCH block is conveyed to the apparatus 10).

Another embodiment may be directed to reducing the time between apparatus 10 receiving a SI request and apparatus 10 broadcasting the SI message. In this example embodiment, apparatus 10 may be controlled by memory 14 and processor 12 to receive, from a UE, a SI request. According to one example, apparatus 10 may then be controlled by memory 14 and processor 12 to transmit an ACK including an indication to the UE that the SI message will be delivered shortly after the UE receives the ACK message, which will be much earlier than the SI window. For example, the transmitted ACK may indicate to the UE that the SI message will be transmitted in a time window or occasion that is shorter than the SI period.

In another embodiment, apparatus 10 may be controlled by memory 14 and processor 12 to inform the UE that the requested SI message will be broadcasted on the same beam associated with the SI request within a time duration that is much shorter than the SI period. For instance, the time duration may be short enough that the downlink beam associated with the SI request remains suitable for SI reception. As one example, the indicated time duration may be such that the downlink beam transmitting the SI message and associated with the SI request is still strong enough to receive the SI message.

In an example embodiment, apparatus 10 may be controlled by memory 14 and processor 12 to transmit the indication as part of the ACK in Msg 2 when the SI request is performed using Msg 1. In another example embodiment, apparatus 10 may be controlled by memory 14 and processor 12 to transmit the indication as part of the ACK in Msg 4 when the SI request is performed using Msg 3. According to certain embodiments, apparatus 10 may also be controlled by memory 14 and processor 12 to indicate to the UE the time duration that the UE should monitor to receive the SI message.

According to some embodiments, apparatus 10 may be controlled by memory 14 and processor 12 to send the indication if the time duration between receiving the SI request and the start of SI window is large enough that the downlink beam corresponding to the SI request may no longer be assumed to be valid for reception in SI window.

In yet another embodiment, apparatus 10 may be controlled by memory 14 and processor 12 to configure the UEs to send the SI requests for an on-demand SI message only within a time duration before the SI window of the corresponding message starts. For example, the time duration may be short enough that the downlink beam associated with the SI request remains suitable for SI reception. The time duration may be configured by the network or given in the specifications.

In some embodiments, the scheduling information for the SI message delivered shortly after the ACK may be conveyed in ACK MSG 2 or Msg 4, in a DCI scheduling the SI message, in RMSI, or fixed in the specifications. The scheduling information for the SI message may include, for example, time/frequency resources, modulation coding scheme (MCS), time duration for monitoring the SI message, etc. In an embodiment, UE(s) that receive the indication, from apparatus 10, in the ACK message may monitor the SI message in the time window that is scheduled shortly after receiving the ACK. However, in an embodiment, UE(s) that do not receive any indication, from apparatus 10, in the ACK message just monitor the SI window for receiving the requested SI message.

Figure 3B:
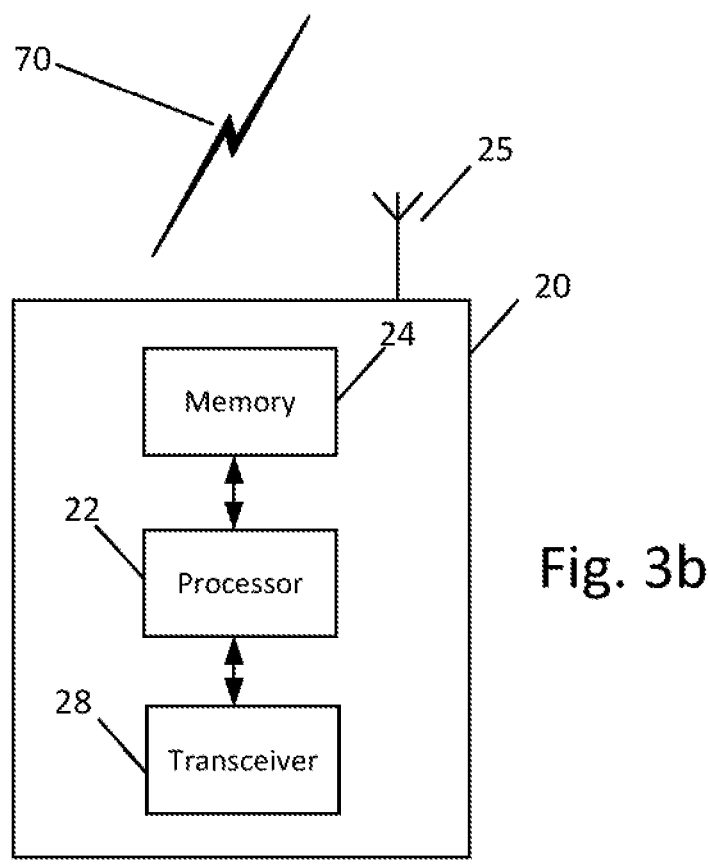
FIG. 3b illustrates an example block diagram of an apparatus, according to another embodiment.

FIG. 3b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3b.

As illustrated in the example of FIG. 3b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For instance, in some embodiments, apparatus 20 may be configured to perform one or more of the processes depicted in any of the flow charts or block diagrams described herein, such as the signaling flow diagram illustrated in FIGS. 1 and 2. As an example, apparatus 20 may be configured for robust reception of SI on a subset of beams.

According to some embodiments, apparatus 20 may be controlled by memory 24 and processor 22 to transmit a SI request to a network node, such as a base station, eNB or gNB. In an embodiment, apparatus 20 may be controlled by memory 24 and processor 22 to receive, from the network node, an ACK acknowledging the SI request. After receiving the ACK message, apparatus 20 may be controlled by memory 24 and processor 22 to monitor the SS/PBCH blocks to determine whether the downlink beam associated with the SI request is still valid for receiving the requested SI message. For example, in an embodiment, apparatus 20 may be controlled by memory 24 and processor 22 to check if a received signal of the downlink beam associated with the SI request is below a certain threshold. In one example, the threshold may be pre-configured by the network. In some embodiments, apparatus 20 may be controlled by memory 24 and processor 22 to determine the validity of the downlink beam based, for example, on an order of superiority between the detected SS/PBCH blocks, on some relative received power difference between them, or on an absolute threshold. According to certain examples, apparatus 20 may not need to monitor all the SS burst sets (where one SS burst corresponds to one complete SS/PBCH block sweep) located between the time instant the ACK is received and the SI window.

In one example, when apparatus 20 detects that the downlink beam associated with the SI request is no longer valid for reception, apparatus 20 may be controlled by memory 24 and processor 22 to, before transmitting a new SI request, re-check in RMSI (e.g., SIB1 in NR) whether the requested SI message will be delivered by broadcast. Thus, if apparatus 20 determines from re-checking the RMSI that the requested SI message will be delivered by broadcast, then apparatus 20 will wait for broadcast of the SI message and not transmit the new SI request. If apparatus 20 determines that the requested SI message will not be broadcast by the network, then apparatus 20 may be controlled by memory 24 and processor 22 to re-transmit the SI request.

In another example, when apparatus 20 detects that the downlink beam associated with the SI request is no longer valid for reception, apparatus 20 may be controlled by memory 24 and processor 22 to re-send the SI request directly, without first checking the RMSI. In other words, according to this example embodiment, apparatus 20 may skip the step of re-checking the RMSI and proceed directly to re-transmitting the SI request. According to some embodiments, apparatus 20 may be controlled by memory 24 and processor 22 to inform the network that the new SI request is actually a re-transmission of a previously sent SI request associated with a downlink beam that is no longer valid for reception. In an embodiment, apparatus 20 may also be controlled by memory 24 and processor 22 to indicate, to the network, the number/index of the SS/PBCH block (beam) that the apparatus 20 can no longer use for receiving the SI message. As an example, the indication that the new SI request is a re-transmission may be signaled in Msg 3 carrying the SI request, or in Msg 1 if extended with a data part, or in a separate message than the one carrying the SI request. After transmitting the new SI request, apparatus 20 may be controlled by memory 24 and processor 22 to receive the SI message on the new downlink beam that apparatus 20 has synchronized to.

In another embodiment, apparatus 20 may be controlled by memory 24 and processor 22 to transmit a SI request to a network node, and to receive an ACK including an indication to the apparatus 20 that the SI message will be delivered in a time window shortly after receiving the ACK message, and which will be much shorter than the SI period. According to one example, the network indication may be transmitted as part of the ACK in Msg 2 when the SI request is performed using Msg 1. In another example, the network indication may be transmitted as part of the ACK in Msg 4 when the SI request is performed using Msg 3. According to certain embodiments, apparatus 20 may also be controlled by memory 24 and processor 22 to receive an indication of the time duration that the UE should monitor to receive the SI message.

In some embodiments, the scheduling information for the SI message delivered shortly after the ACK may be conveyed in ACK MSG 2 or Msg 4, in a DCI scheduling the SI message, in RMSI, or fixed in the specifications. The scheduling information for the SI message may include, for example, time/frequency resources, modulation coding scheme (MCS), time duration for monitoring the SI message, etc.

According to certain embodiments, apparatus 20 may be controlled by memory 24 and processor 22 to receive the indication if the time duration between receiving the SI request and the start of SI window is large enough that the downlink beam corresponding to the SI request may no longer be assumed to be valid for reception in SI window. In an embodiment, based on the receipt of the network indication in the ACK message, apparatus 20 may be controlled by memory 24 and processor 22 to monitor the SI message in the time window that is scheduled shortly after receiving the ACK.

Figure 4A:
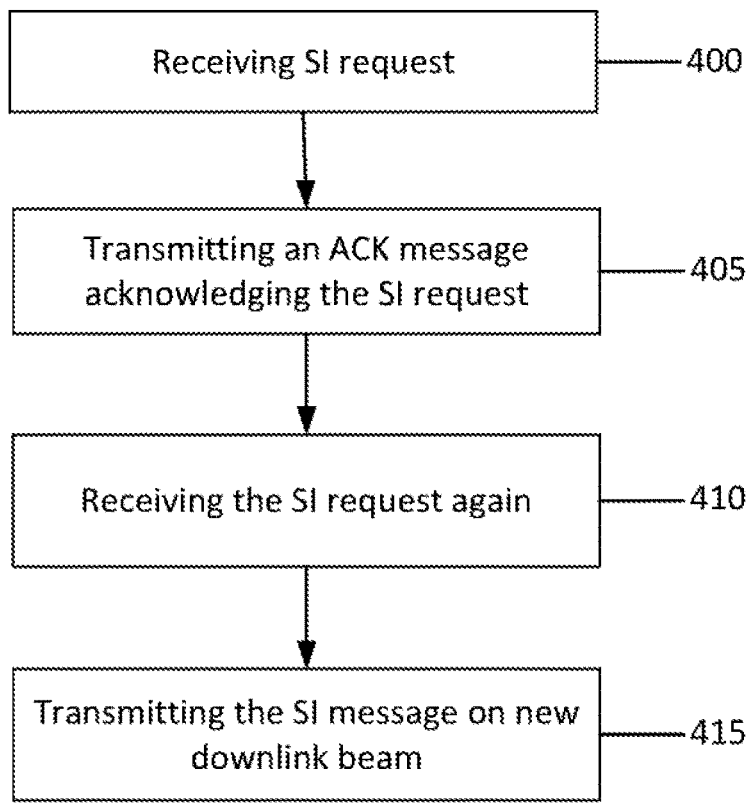
FIG. 4a illustrates an example flow diagram of a method, according to one embodiment.

FIG. 4a illustrates an example flow diagram of a method for SI delivery, according to one embodiment. In certain embodiments, the flow diagram of FIG. 4a may be performed by a network node, such as an access point, base station, node B, eNB, gNB, or any other access node. As illustrated in the example of FIG. 4a, the method may include, at 400, receiving a SI request from a UE. The method may then include, at 405, transmitting an ACK message acknowledging the SI request to the UE. According to certain embodiments, the method may include selecting, by the network node, a subset of downlink beams for transmitting the requested SI message. In an embodiment, for example when the UE determines that the downlink beam associated with the SI request is no longer valid for receiving the requested SI message, the method may include, at 410, receiving a new SI request again from the UE. For example, the new SI request may be associated with an updated SS/PBCH block index.

According to some embodiments, the receiving 410 of the new SI request may include receiving an indication informing the network node that the new SI request is actually a re-transmission of a previously sent SI request (i.e., the SI request received in step 400) that is associated with a downlink beam that is no longer valid for reception.

In an embodiment, the receiving 410 may include receiving the new SI request along with an indication of the number/index of the SS/PBCH block (beam) that the UE can no longer use for receiving the SI message. As an example, the receiving 410 may include receiving the UE indication that the new SI request is a re-transmission in Msg 3 carrying the SI request, or in Msg 1 if extended with a data part, or in a separate message than the one carrying the SI request. After receiving the new SI request, the method may include, at 415, transmitting the SI message on the new downlink beam, e.g., the subset of downlink beams, that is valid for reception at the UE, and refraining from sending it on the downlink beam that the UE can no longer use for SI reception.

Figure 4B:
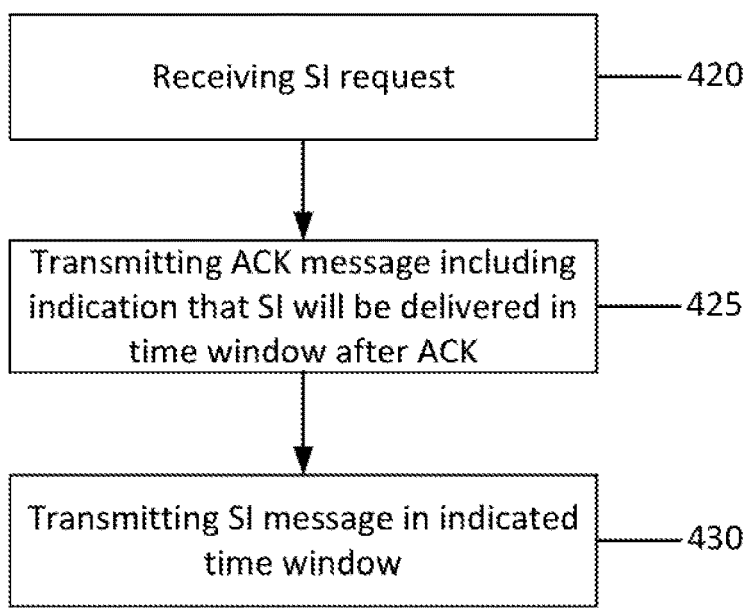
FIG. 4b illustrates an example flow diagram of a method, according to another embodiment.

FIG. 4b illustrates an example flow diagram of a method for reducing the time between a network receiving a SI request and broadcasting the SI message, according to an embodiment. In certain embodiments, the flow diagram of FIG. 4b may be performed by a network node, such as an access point, base station, node B, eNB, gNB, or any other access node. In the example of FIG. 4b, the method may include, at 420, receiving, from a UE, a SI request. According to one example, the method may also include, at 425, transmitting an ACK message including an indication to the UE that the SI message will be delivered in a time window beginning shortly after the UE receives the ACK message, which will be much earlier than the SI window. According to one embodiment, the method may also include transmitting the requested SI message on a subset of downlink beams that is valid for reception at the UE. In an embodiment, the transmitting 425 may further include informing the UE that the requested SI message will be transmitted on a same subset of downlink beams associated with the SI request.

In an example embodiment, the transmitting 425 may include transmitting the indication as part of the ACK in Msg 2 when the SI request is performed using Msg 1. In another example embodiment, the transmitting 425 may include transmitting the indication as part of the ACK in Msg 4 when the SI request is performed using Msg 3. According to certain embodiments, the transmitting 425 may further include transmitting an indication, to the UE, of the time duration that the UE should monitor to receive the SI message. According to some embodiments, the transmitting 425 may include sending the indication if the time duration between receiving the SI request and the start of SI window is large enough that the subset of downlink beams corresponding to the SI request may no longer be assumed to be valid for reception in SI window.

In some embodiments, the scheduling information for the SI message delivered shortly after the ACK may be conveyed in ACK MSG 2 or Msg 4, in a DCI scheduling the SI message, in RMSI, or fixed in the specifications. The scheduling information for the SI message may include, for example, time/frequency resources, modulation coding scheme (MCS), time duration for monitoring the SI message, etc. In an embodiment, UE(s) that receive the indication, from the network node, in the ACK message may monitor the SI message in the time window that is scheduled shortly after receiving the ACK. However, in an embodiment, UE(s) that do not receive any indication, from the network node, in the ACK message just monitor the SI window for receiving the requested SI message. In an embodiment, the method may further include, at 430, transmitting the SI message in the time window indicated in the ACK message.

Figure 4C:
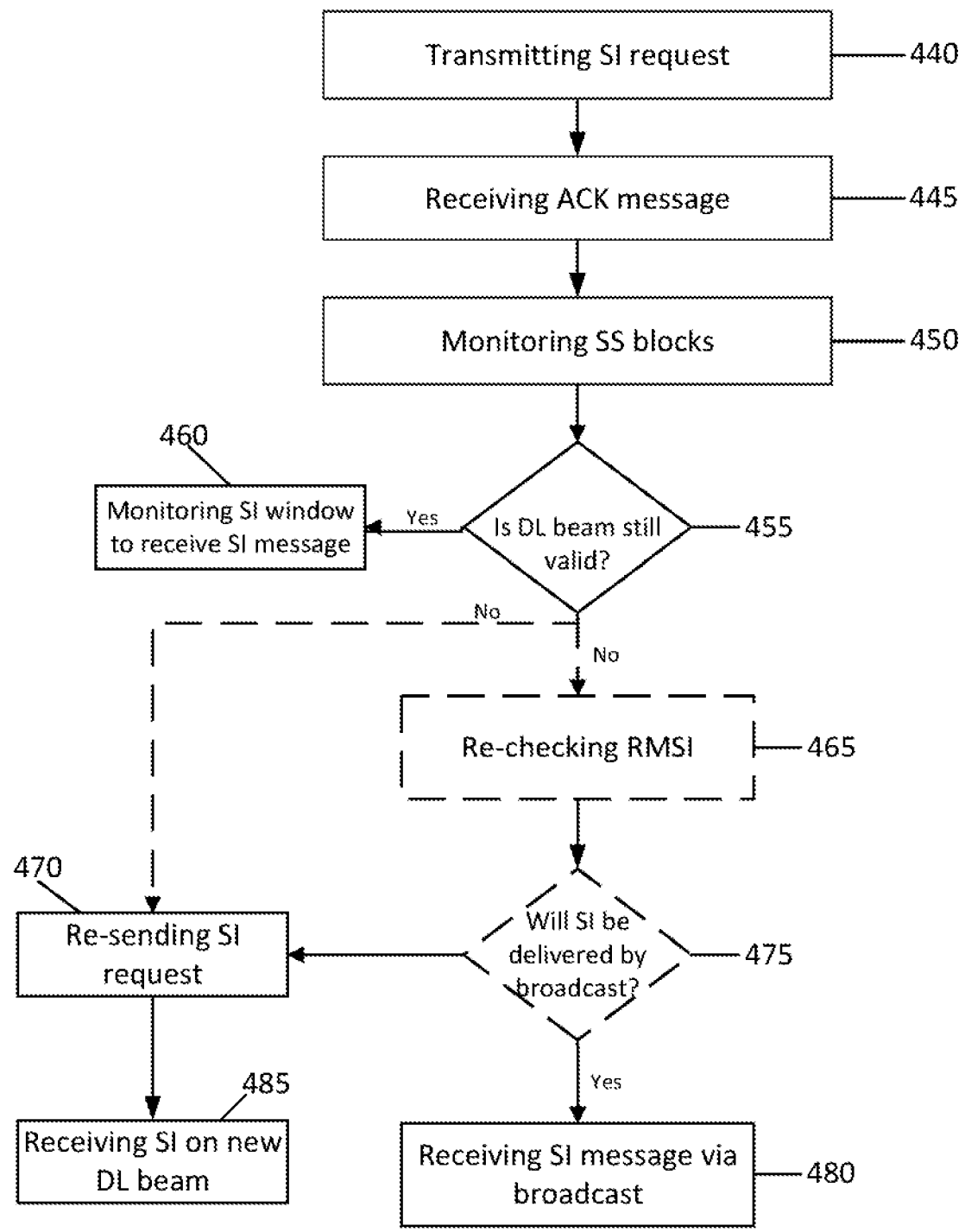
FIG. 4c illustrates an example flow diagram of a method, according to another embodiment.

FIG. 4c illustrates an example flow diagram of a method for receipt of SI on a subset of beams, according to one embodiment. In certain embodiments, the flow diagram of FIG. 4c may be performed, for example, by a UE, mobile station, mobile equipment, IoT device, or the like. According to some embodiments, the method may include, at 440, transmitting a SI request to a network node and, at 445, receiving an ACK message acknowledging the SI request. After receiving the ACK message, the method may include, at 450, monitoring the SS/PBCH blocks to determine whether a subset of downlink beams associated with the SI request is still valid for receiving the requested SI message. For example, in an embodiment, the monitoring 450 may include checking whether a received signal of the subset of downlink beams associated with the SI request is below a certain threshold. In one example, the threshold may be pre-configured by the network. In some embodiments, the monitoring 450 may include determining the validity of the subset of downlink beams based, for example, on an order of superiority between the detected SS/PBCH blocks, on some relative received power difference between them, or on an absolute threshold. If it is determined at 455 that the subset of downlink beams associated with the SI request is still valid for reception, then the method may include, at 460, monitoring the regular SI window to receive the SI message.

In one example, when it is detected at 455 that the subset of downlink beams associated with the SI request is no longer valid for reception, the method may optionally include, before re-transmitting the SI request, re-checking in RMSI whether the requested SI message will be delivered by broadcast at 465. If it is determined, at 475, that the requested SI message will be delivered by broadcast, then the method may include, at 480, receiving the SI message by broadcast and not re-transmitting the SI request. If it is determined, at 475, that the requested SI message will not be broadcast by the network, then the method may include re-transmitting a new SI request at 470.

In another example, when it is detected at 455 that the subset of downlink beams associated with the SI request is no longer valid for reception, the method may proceed directly to re-transmitting a new SI request at 470, without first checking the RMSI. In other words, according to this example embodiment, the method may skip steps 465 and 475, and instead proceed directly to the re-transmitting step 470. According to some embodiments, the re-transmitting 470 may include informing the network that the new SI request is actually a re-transmission of a previously sent SI request associated with a subset of downlink beams that is no longer valid for reception. In an embodiment, the re-transmitting 470 may include indicating, to the network, the number/index of the SS/PBCH block (beam) that the UE can no longer use for receiving the SI message. As an example, the re-transmitting 470 may include transmitting the indication that the new SI request is a re-transmission in Msg 3 carrying the SI request, or in Msg 1 if extended with a data part, or in a separate message than the one carrying the SI request. After transmitting the new SI request, the method may include, at 485, receiving the SI message on a new subset of downlink beams that is valid for reception at the UE.

Figure 4D:
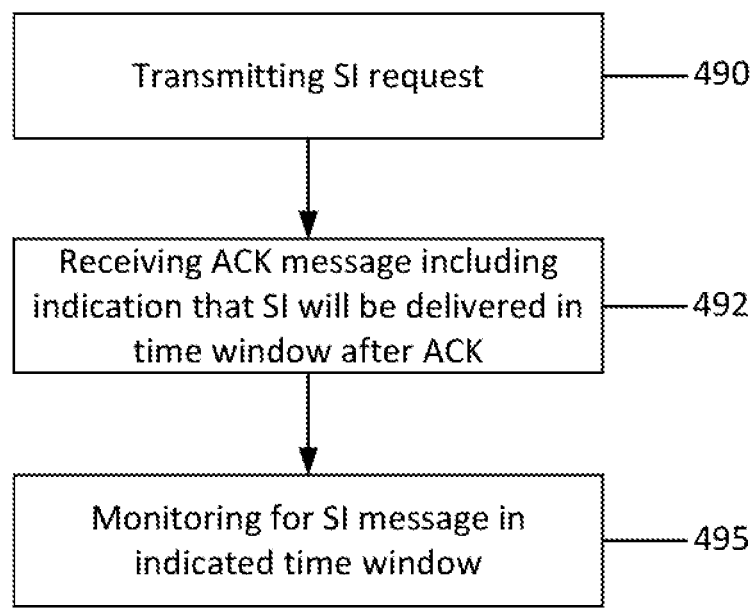
FIG. 4d illustrates an example flow diagram of a method, according to another embodiment.

FIG. 4d illustrates an example flow diagram of a method for receipt of SI on a subset of beams, according to one embodiment. In certain embodiments, the flow diagram of FIG. 4d may be performed, for example, by a UE, mobile station, mobile equipment, IoT device, or the like. According to some embodiments, the method may include, at 490, transmitting a SI request to a network node. The method may then include, at 492, receiving an ACK message including an indication to the UE that the SI message will be delivered shortly after receiving the ACK message, which will be much earlier than the SI window. According to one example, the receiving 492 may include receiving the network indication as part of the ACK in Msg 2 when the SI request is performed using Msg 1. In another example, the receiving 492 may include receiving the network indication as part of the ACK in Msg 4 when the SI request is performed using Msg 3. According to certain embodiments, the receiving 492 may include receiving an indication of the time duration that the UE should monitor to receive the SI message.

In some embodiments, the scheduling information for the SI message delivered shortly after the ACK may be conveyed in ACK MSG 2 or Msg 4, in a DCI scheduling the SI message, in RMSI, or fixed in the specifications. The scheduling information for the SI message may include, for example, time/frequency resources, modulation coding scheme (MCS), time duration for monitoring the SI message, etc.

According to certain embodiments, the receiving 492 may include receiving the indication if the time duration between receiving the SI request and the start of SI window is large enough that the subset of downlink beams corresponding to the SI request may no longer be assumed to be valid for reception in SI window. In an embodiment, based on the receipt of the network indication in the ACK message, the method may include, at 495, monitoring the SI message in the indicated time window that is scheduled shortly after receiving the ACK.

Therefore, certain example embodiments provide several technical improvements, enhancements, and/or advantages. Various example embodiments are able to provide for robust SI delivery and/or reception. As a result of some embodiments, signaling and network overhead are reduced. In addition, certain embodiments are able to reduce UE power consumption.

As such, example embodiments can improve performance, latency, and/or throughput of networks and network nodes including, for example, access points, base stations/eNBs/gNBs, and mobile devices or UEs. Accordingly, the use of certain example embodiments result in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

We claim:

1. A method, comprising:
receiving, by a network node, a system information (SI) request from a user equipment (UE);
transmitting an acknowledgement of the system information (SI) request to the user equipment (UE);
selecting, by the network node, a subset of downlink beams for transmitting the requested system information (SI) message;
receiving, from the user equipment (UE), a new system information (SI) request associated with an updated synchronization signal and physical broadcast channel (SS/PBCH) block index; and
based on the updated synchronization signal and physical broadcast channel (SS/PBCH), transmitting the system information (SI) message on the subset of downlink beams that is valid for reception at the user equipment (UE).

2. The method of claim 1, wherein the selecting comprises selecting the subset of downlink beams based on system information (SI) requests associated with synchronization signal and physical broadcast channel (SS/PBCH) blocks, and the subset of downlink beams associated with the system information (SI) requests are used for delivery of a system information (SI) message.

3. The method of claim 1, wherein the new SI request comprises an indication informing the network node that the new system information (SI) request is a re-transmission of the received system information (SI) request associated with a downlink beam that is no longer valid for reception.

4. The method of claim 3, further comprising receiving, from the user equipment (UE), a number/index of the synchronization signal and physical broadcast channel (SS/PBCH) block that the user equipment (UE) can no longer use for receiving the system information (SI) message.

5. An apparatus, comprising:
at least one processor; and
at least one memory comprising computer program code,
the at least one memory and computer program code configured, with the at least one processor, to cause the apparatus at least to
receive a system information (SI) request from a user equipment (UE);
transmit an acknowledgement of the system information (SI) request to the user equipment (UE);
select a subset of downlink beams for transmitting the requested system information (SI) message;
receive a new system information (SI) request associated with an updated synchronization signal and physical broadcast channel (SS/PBCH) block index; and
based on the updated synchronization signal and physical broadcast channel (SS/PBCH), transmit the system information (SI) message on the subset of downlink beams that is valid for reception at the user equipment (UE).

6. The apparatus of claim 5, wherein the at least one memory and computer program code are further configured, with the at least one processor, to cause the apparatus at least to select the subset of downlink beams based on system information (SI) requests associated with synchronization signal and physical broadcast channel (SS/PBCH) blocks, and the subset of downlink beams associated with the system information (SI) requests are used for delivery of a system information (SI) message.

7. The apparatus of claim 5, wherein the new SI request comprises an indication informing the network node that the new system information (SI) request is a re-transmission of the received system information (SI) request associated with a downlink beam that is no longer valid for reception.

8. The apparatus of claim 7, wherein the at least one memory and computer program code are further configured, with the at least one processor, to cause the apparatus at least to receive, from the user equipment (UE), a number/index of the synchronization signal and physical broadcast channel (SS/PBCH) block that the user equipment (UE) can no longer use for receiving the system information (SI) message.

9. A method, comprising:
monitoring synchronization signal and physical broadcast channel (SS/PBCH) blocks to determine whether a subset of downlink beams associated with a previously transmitted system information (SI) request is still valid for receiving a requested system information (SI) message; and
when it is determined that the subset of downlink beams associated with the previously transmitted system information (SI) request is no longer valid for receiving the requested system information (SI) message, the method further comprises
checking remaining minimum system information (RMSI) to determine whether the requested system information (SI) message will be broadcast using all downlink beams, or
transmitting a new system information (SI) request.

10. The method of claim 9, wherein the new system information (SI) request is associated with an updated synchronization signal and physical broadcast channel (SS/PBCH) block index.

11. The method of claim 9, wherein, if it is determined that a new, requested SI message will be broadcast, then the method comprises waiting for the broadcast of the system information (SI) message without transmitting the new system information (SI) request.

12. The method of claim 9, wherein, when it is determined that the subset of downlink beams associated with the previously transmitted system information (SI) request is no longer valid for receiving the requested system information (SI) message, directly transmitting the new system information (SI) request without checking the remaining minimum system information (RMSI).

13. The method of claim 9, wherein it is determined whether the subset of downlink beams associated with a transmitted system information (SI) request is still valid for receiving a new, requested system information (SI) message, based on at least one of whether a received signal of the subset of downlink beams associated with the system information (SI) request is below a certain threshold, on an order of superiority between the detected synchronization signal and physical broadcast channel (SS/PBCH) blocks, or on some relative received power difference between them, or on an absolute threshold.

14. The method of claim 9, further comprising transmitting, to the network node, a number/index of the synchronization signal and physical broadcast channel (SS/PBCH) block that the user equipment (UE) can no longer use for receiving the SI message.

15. An apparatus, comprising:
at least one processor; and
at least one memory comprising computer program code,
the at least one memory and computer program code configured, with the at least one processor, to cause the apparatus at least to
monitor synchronization signal and physical broadcast channel (SS/PBCH) blocks to determine whether a subset of downlink beams associated with a previously transmitted system information (SI) request is still valid for receiving the requested system information (SI) message; and
when it is determined that the subset of downlink beams associated with the previously transmitted system information (SI) request is no longer valid for receiving the requested system information (SI) message, the at least one memory and computer program code configured, with the at least one processor, to cause the apparatus at least to
check remaining minimum system information (RMSI) to determine whether the requested system information (SI) message will be broadcast using all downlink beams, or
transmit a new system information (SI) request.

16. The apparatus of claim 15, wherein the new system information (SI) request is associated with an updated synchronization signal and physical broadcast channel (SS/PBCH) block index.

17. The apparatus of claim 15, wherein, if it is determined that the requested system information (SI) message will be broadcast, then the at least one memory and computer program code configured, with the at least one processor, to cause the apparatus at least to wait for the broadcast of the system information (SI) message without transmitting the new system information (SI) request.

18. The apparatus of claim 15, wherein, when it is determined that the subset of downlink beams associated with the previously transmitted system information (SI) request is no longer valid for receiving the requested system information (SI) message, the at least one memory and computer program code configured, with the at least one processor, to cause the apparatus at least to directly transmit the new system information (SI) request without checking the remaining minimum system information (RMSI).

19. The apparatus of claim 15, wherein it is determined whether the subset of downlink beams associated with a transmitted system information (SI) request is still valid for receiving the requested system information (SI) message, based on at least one of whether a received signal of the subset of downlink beams associated with the system information (SI) request is below a certain threshold, on an order of superiority between the detected synchronization signal and physical broadcast channel (SS/PBCH) blocks, or on some relative received power difference between them, or on an absolute threshold.

20. The apparatus of claim 15, wherein the at least one memory and computer program code are configured, with the at least one processor, to cause the apparatus at least to transmit, to the network node, a number/index of the synchronization signal and physical broadcast channel (SS/

PBCH) block that the user equipment (UE) can no longer use for receiving the SI message.

\* \* \* \* \*